United States Patent
Lai et al.

(10) Patent No.: US 8,924,643 B2
(45) Date of Patent: Dec. 30, 2014

(54) SYSTEM AND METHOD FOR CACHING MULTIMEDIA DATA

(75) Inventors: Yung-Hsiao Lai, Fremont, CA (US); Andy Chao Hung, Los Altos, CA (US)

(73) Assignee: 8324450 Canada Inc., Toronto, Ontario (CA)

( * ) Notice: Subject to any disclaimer, the term of this patent is extended or adjusted under 35 U.S.C. 154(b) by 883 days.

(21) Appl. No.: 12/872,695

(22) Filed: Aug. 31, 2010

(65) Prior Publication Data
US 2010/0332754 A1 Dec. 30, 2010

Related U.S. Application Data

(63) Continuation of application No. 10/765,383, filed on Jan. 27, 2004, now Pat. No. 7,809,252.

(60) Provisional application No. 60/461,664, filed on Apr. 9, 2003.

(51) Int. Cl.
G06F 13/00 (2006.01)
G06F 3/06 (2006.01)
G06F 12/08 (2006.01)

(52) U.S. Cl.
CPC ............ *G06F 3/0656* (2013.01); *G06F 3/0625* (2013.01); *G06F 3/0674* (2013.01); *G06F 3/0679* (2013.01); *G06F 12/0862* (2013.01); *G06F 12/0866* (2013.01); *G06F 2212/1028* (2013.01); *G06F 2212/464* (2013.01); *Y02B 60/1225* (2013.01); *Y02B 60/1246* (2013.01)
USPC ........... 711/118; 711/100; 711/117; 386/239; 386/248; 386/326; 386/353

(58) Field of Classification Search
CPC ..... H04N 5/85; H04N 9/8042; G11B 27/105; G06F 3/0601; G06F 12/0802; G06F 12/0864
USPC .......... 711/100, 1–5, 117, 118; 386/239, 248, 386/326, 353
See application file for complete search history.

(56) References Cited

U.S. PATENT DOCUMENTS 5,463,772 A 10/1995 Thompson et al.
5,875,352 A 2/1999 Gentry et al.
6,332,175 B1 12/2001 Birrell et al.
(Continued)

OTHER PUBLICATIONS

DVD Idle: Extend the Lifetime of DVD Drive by up to 800%! [online]. Fengtao Software [http://dvd-idle.com/dvd-idle.htm], pp. 1 (Originally retrieved Apr. 29, 2004 and filed as Non-Patent Literature to U.S. Appl. No. 10/765,383.
DVD Idle: Extend the Lifetime of DVD Drive by up to 800%! [online]. Fengtao Software [http://dvd-idle.com/new.htm], pp. 1-4 (Originally retrieved Apr. 29, 2004 and filed as Non-Patent Literature to Parent U.S. Appl. No. 10/765,383.
(Continued)

*Primary Examiner* — Hung Dang
*Assistant Examiner* — Mishawn Dunn
(74) *Attorney, Agent, or Firm* — Pillsbury Winthrop Shaw Pittman LLP

(57) ABSTRACT

Systems and methods are provided for caching media data to thereby enhance media data read and/or write functionality and performance. A multimedia apparatus, comprises a cache buffer configured to be coupled to a storage device, wherein the cache buffer stores multimedia data, including video and audio data, read from the storage device. A cache manager coupled to the cache buffer, wherein the cache buffer is configured to cause the storage device to enter into a reduced power consumption mode when the amount of data stored in the cache buffer reaches a first level.

25 Claims, 6 Drawing Sheets

(56) References Cited

U.S. PATENT DOCUMENTS

| | | | |
|---|---|---|---|
| 6,532,513 | B1 | 3/2003 | Yamamoto et al. |
| 6,647,499 | B1 | 11/2003 | Morcom |
| 7,330,640 | B2 | 2/2008 | Schultz et al. |
| 7,574,272 | B2 | 8/2009 | Gibbs et al. |
| 7,817,900 | B2 * | 10/2010 | Walker ............ 386/278 |
| 2002/0054309 | A1 | 5/2002 | Rao |
| 2005/0141375 | A1 | 6/2005 | Ehrlich et al. |
| 2005/0278522 | A1 | 12/2005 | Fortin et al. |
| 2007/0104269 | A1 | 5/2007 | Xue et al. |

OTHER PUBLICATIONS

DVD Idle: Extend the Lifetime of DVD Drive by up 800%! [online]. Fengtao Software [http://dvd-idle.com/new2.htm], pp. 1-5 (Originally retrieved Apr. 29, 2004 and filed as Non-Patent Literature to Parent U.S. Appl. No. 10/765,383.

DVD Specification for Ready-Only Disc — Select Provisions (Figure 3.3 12.3-3, Figure 3.1.4.1), pp. 1-3, Aug. 1996.

* cited by examiner

SYSTEM AND METHOD FOR CACHING MULTIMEDIA DATA

CROSS-REFERENCE TO PRIORITY APPLICATIONS

This application claims benefit of priority from U.S. patent application Ser. No. 10/765,383, filed Jan. 27, 2004, and U.S. Provisional Patent Application 60/461,664, filed Apr. 9, 2003, the contents of which are incorporated herein in their entirety.

FIELD OF THE INVENTION

This invention is related to media processing and in particular, to systems and methods for caching media.

BACKGROUND OF THE INVENTION

Multimedia, such as video and audio data, is often stored on a mass storage medium, such as a Digital Versatile Disk (DVD), Compact Disc (CD), a hard disk drive, a FLASH memory drive, and the like. Often, to reduce the space to store such multimedia, the multimedia is compressed and encoded using a coding technology, such as MPEG 1, MPEG 2, MPEG 4, and the like.

Media streaming often involves the process of sequentially transmitting multimedia data streams, such as audio and video data streams, between a host machine and a stream storage device. The host machine can be a PC or a consumer electronic device, such as a DVD recorder. The stream storage device can be a local mass storage device, including storage media, or a server machine connected over a network to the host machine.

Conventionally, multimedia data is read in a sequential fashion from a media source, such as a mass storage device or over a network. The individual data streams are then presented together to a user via a decoding and rendering process. Often not all of the data is immediately available at the decoder, and a media seek operation may be need to access data, which can include a latency. The latency can result from a head seek on a disk drive or a position change request to the network media source, by way of example. Due to the nature of media storage devices, data access time may vary depending on a number of parameters that are often not easily predicted or controlled.

Many conventional data storage devices, including optical and magnetic disks, utilize "tracks" to store data. Each disk or disk platter may have thousands of tracks. The tracks may be concentric, as on conventional magnetic disks and some optical disks. Each track is further divided into sectors.

A read track buffer is often used to read slightly ahead and buffer data that is read from media, so as to prevent the de-multiplexing and decoding stages from encountering data starvation due to access latency of the media storage device. Thus, the read track buffer can smooth fluctuations in the bit stream that might result from irregular media accesses. The track buffer is usually implemented using volatile random access memory (RAM) that provides relatively fast access storage as compared to the media source or storage device. Data sectors are read from the media source and are temporarily stored in the read track buffer in a sequential manner.

In order to keep the read track buffer relatively small, such as 2 Mbit in size, the sectors stored in the track buffer are typically deleted, invalidated, ignored or overwritten immediately after they have been de-multiplexed, decoded, and rendered. However, because the size of the read track buffer is relatively small, often only a small amount of data can be buffered at a given time. As a result, most sectors from the source media are generally read into the read track buffer as track buffer space is freed by decoding. This process results in frequent and substantially constant media access operations when playing the source media, often many times per second.

Conventional multimedia read processes often have several disadvantages. For example, on many platforms where system power consumption is a major concern, such as a portable computing device operating on battery power (laptops, portable DVD players, and the like), the frequent access operations may keep the media access device spinning all of the time during a play operation, consuming a significant amount of power and reducing battery life.

In addition, because many platforms include relatively small read track buffers, they may only allow the reading of one media location, such as one small contiguous group of memory addresses, at a given time.

Further, because many platforms include relatively small read track buffers, the read track buffer data is often discarded on a media scanning operation such as fast forward or fast rewind/reverse. Thus, these platforms may require a re-read operation should a user want to revisit previously played data (such as for a 10 second jump-back operation).

Similarly, many conventional multimedia write processes suffer from several disadvantages. Typically, a multimedia signal, such as a television signal, is sampled and encoded into individual data streams by applying a coding technology, such as MPEG 1, MPEG 2, or MPEG 4. The individual data streams are typically multiplexed to form a single data stream, which is then written to a mass storage device media, such as a DVD, a CD, a magnetic disk, or the like.

A write track buffer is often used as temporary storage for the data stream that is to be written to the mass storage device media. Typically, the data stream is read from the write track buffer and written to the mass storage device media in units of one sector or a predefined number of sectors. For example, many DVD write formats use a 16 sector elementary physical writing unit. The size of the write track buffer is often relatively small, such as 8 Mbit in size, and as a result, the sectors will be written to mass storage device as long as there are sufficient number of sectors to write stored in the write track buffer. Therefore, frequent and substantially constant media access operations occur when playing the media, often many times per second.

Often these conventional multimedia write processes suffer from several deficiencies. As similarly described above with respect to many conventional read processes, on platforms where system power consumption is a major concern, such as a portable computing device operating on battery power, the constant intermittent access keeps the media access device spinning all of the time, consuming a significant amount of power and reducing battery life.

Further, the writing speed to a mass storage device is often faster than media stream sampling and encoding. Due to the speed mismatch, for some CD or DVD mass storage writing devices, which are better operated using a constant writing speed, such as 4 times or 16 times of maximal stream data rate, the writing process needs to be either operated at a less than optimal speed, or turned off intermittently to match the slower sampling/encoding process. This process results in worse writing performance and can increase the wear on the mass storage device.

In addition, for some CD or DVD mass storage writing devices, a significant writing latency occurs at the very beginning of the writing process because the mass storage writing device has to spin up the media or disc to a certain speed. Further, when a new writing destination is far from the previous writing destination, the device needs time to seek to the new location. As a result of the relatively small size of the write track buffer, a significant latency in writing can temporarily prevent or halt the sampling/encoding process, and can result in the degradation of encoded stream quality or in the loss of portions of the stream.

Additionally, some multimedia write applications output the encoded multimedia data stream to an intermediate file first, and then the encoded multimedia data stream is written from the intermediate file to the mass storage writing device, such as a DVD or CD device. However, the use of an intermediate file often disadvantageously utilizes a relatively large space in local storage, such as on a hard disk drive, to serve as temporary space. Further, the user of the intermediate file also results in a longer write process as compared to the use of a single pass write process that does not use an intermediate file.

Still further, the destination location on the mass storage media may be randomly selected depending on the writing application. As a result, some CD or DVD writing mass storage devices have to frequently seek to specific locations while performing the writing process, which can result in intermittent writing delays and can also result in faster wearing of the CD or DVD mass storage device.

SUMMARY OF THE INVENTION

The present invention is related to systems and methods for caching media data to thereby enhance media data read and/or write functionality and performance.

In one example embodiment a media stream cache module is placed, structurally of functionally, in the data path between the read and/or write track buffers and the mass storage device. The cache module can reduce the frequency of media access and advantageously can reduce power consumption to allow for longer battery powered operation. In addition, the useful life of a physical storage medium, such as a DVD or a CD, and that of the corresponding recording/playback device, such as a DVD drive or a CD drive, can optionally be extended.

One example embodiment is a multimedia playback apparatus, comprising: a cache buffer that stores multimedia data, including video and audio data, read from a storage device; a cache manager that controls said cache buffer and that causes the storage device to enter into a reduced power consumption mode when said amount of data stored in said cache buffer reaches a first level; and a track buffer that stores a first amount of said multimedia data read from said cache buffer.

Another example embodiment is a method of controlling a multimedia storage device, the method comprising: storing multimedia data read from a storage drive into a multimedia cache; receiving a scan command; and transferring the corresponding multimedia data from the multimedia cache to a track buffer for rendering when said multimedia data corresponding to said scan command is stored in said multimedia cache.

Still another example embodiment is a method of processing multimedia data, comprising: determining that a storage device is reading multimedia data; transferring a first quantity of multimedia data from said storage device to a media cache; once said first quantity of said multimedia data is stored in said media cache, ceasing the transfer of said multimedia data from said storage device into said media cache and causing said storage device to enter into a power saving mode; writing said multimedia data from said media cache to a track buffer for rendering; and at least partly in response to the quantity of said multimedia data in stored in the media cache falling to a first threshold, causing said storage device to spin up.

Yet another example embodiment is a method of processing multimedia data when a storage device is idle, comprising: writing multimedia data from a cache buffer to a track buffer for rendering while said storage device is idle; and at least partly in response to a quantity of said multimedia data stored in said media cache falling to a first threshold, causing said storage device to spin up.

One example embodiment is a multimedia apparatus, comprising: a cache buffer that stores multimedia data, including video and audio data; and a cache manager that manages said cache buffer, wherein said cache buffer is configured to cause a storage device to enter into a reduced power consumption mode when the amount of said multimedia data stored in said cache buffer reaches a first level.

Another example embodiment is a multimedia apparatus, comprising: a write track buffer configured to store a first amount of multimedia data; a write cache buffer that caches said multimedia data from said write track buffer, wherein said write cache buffer is several times the size of said write track buffer, and wherein said write cache buffer stores said multimedia data intended to be written to a storage device; and a cache manager that causes said storage device to enter into a reduced power consumption mode when the amount of said multimedia data stored in said cache buffer reaches a first level.

Still another example embodiment is a method of processing media data to be written to a non-volatile storage device, comprising: determining the quantity of media data stored in a cache buffer; and when the quantity of media data stored in said cache buffer is at a first level, causing said non-volatile storage device to spin down.

DETAILED DESCRIPTION

The present invention is related to media processing and in particular, to systems and methods for caching media to thereby enhance read and/or write functionality and performance.

The functions described herein can be performed by software, firmware, hardware, or any combination of the foregoing. For example, software programs can comprise executable code or instructions running on one or more apparatuses, such as general purpose computers or consumer devices. The computers or consumer devices can include one or more central processing units for executing program code, volatile memory, such as RAM for temporarily storing data and data structures during program execution, non-volatile memory, such as a hard disc drive or optical drive, for storing programs and data, including databases, and a network interface for accessing an intranet and/or the Internet. However, the present invention can also be implemented using special purpose computers, state machines, dedicated encoders and decoders, and/or hardwired electronic circuits. The example processes described herein do not necessarily have to be performed in the described sequence, and not all states have to be reached or performed.

For the sake of clarity, the following descriptions of example embodiments relate to the use of a media cache in the context of reading and writing media streams to a local storage device. However, the techniques, processes, and apparatus disclosed herein are also applicable to streaming through network devices such as an aerial antenna, satellite antenna, wired ("cable") broadcasting, Internet transmission, intranet transmission, mobile communication networks, and the like. In addition, while portions of the following description relate to a computer platform, the techniques, processes, and apparatus disclosed herein are also applicable to other platforms, such as television set-top boxes, dedicated DVD players, personal digital video recorders/players, personal digital assistants having mass memory, and the like.

In order to enhance read and/or write performance, and to overcome some or all of the disadvantages discussed above relating to reading and writing media streams from and to a mass storage device, in one example embodiment a media stream cache module is placed, structurally of functionally, in the data path between the read and/or write track buffers and the mass storage device.

Figure 1:
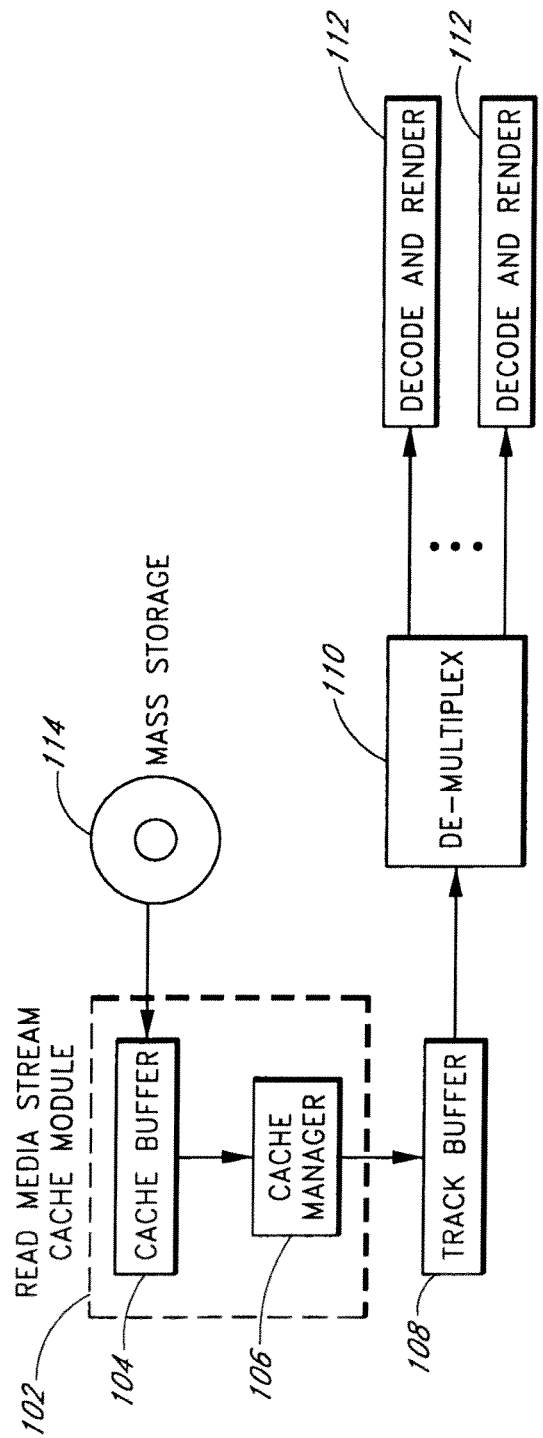
FIG. 1 illustrates an example system that can be used in accordance with one embodiment of the present invention to read multimedia data.

The use of a read cache module for read operations will now be described in greater detail. Referring to FIG. 1, one embodiment of a read cache module 102 for reading media streams includes a read cache buffer 104 and a read cache manger 106. The read cache buffer 104 stores media data that is read from a mass storage device 114 and has a relatively large capacity as compared to a read track buffer 108, which often is sized at about 2 Mbit in size. Thus, for example, the read cache buffer 104 can be ten times, one hundred times, one thousand times, or more the size of the read track buffer 108. By way of further example, the read cache buffer can be sized to hold 5 minutes of audiovisual data, or can be 256 Mbytes in size, though other sizes can be used as well. The read cache buffer 104 can optionally be implemented as a circular or ring buffer.

The mass storage device 114 can include both a drive and removable or fixed data storage media. The read track buffer 108 may be coupled or wirelessly connected to a demultiplex circuit 110, which in turn is coupled or wirelessly connected to one or more decode and render circuits 112. The demultiplex circuit 110 separates the video, audio and subpicture components. The render circuits 112 will then render the components, so that the video will be displayed and the audio played. For example, the video can be displayed on a television set or a CRT, LCD, or Plasma display or monitor coupled to a tuner, cable network, and/or a personal computer. The audio can be played on speakers associated with the foregoing displays, or with a radio, computer, and so on.

In one embodiment, the read cache buffer 104 can be formed from a portion of available internal or external memory associated with the system, such as from a portion of a computer system's main system RAM and or a portion of available non-volatile memory, such a the mass storage device 114. In another embodiment, the read cache buffer 104 includes dedicated memory reserved solely for use by the read cache manager 106. In addition, the read cache manager 106 and the read cache buffer 104 can be located on the same integrated circuit or chip or on separate circuits or chips.

The read cache manager 106 controls the data transfer from the read cache buffer 104 to the read track buffer 108. The data transfer can be performed, by way of example, by physically copying memory blocks from the read cache buffer 104 to the read track buffer 108, or through memory pointer manipulation. For example, a block of memory of what was allocated to the read cache buffer 104 can be temporarily allocated to the read track buffer 108, so that the data stored in the block is logically "moved" from the read cache buffer 104 to the read track buffer 108.

As will be described in greater detail below, the read cache manager 106 and the read cache buffer 104 are configured to reduce the frequency of media access. This advantageously can reduce power consumption and can extend the useful life of a physical storage medium, such as a DVD or a CD, and that of the corresponding recording/playback device, such as a DVD drive or a CD drive.

When the media access mass storage device 114 is rotating media or in some other relatively high power consumption mode, one embodiment of the read cache manager 106 is configured to continuously fetch sectors of data so long as there is space, or at least a threshold amount of space available in the read cache buffer 104. During this period of time, the mass storage device 114 is reading sectors relatively fast and efficiently. After the read cache buffer 104 is relatively full, the read cache manager 106 stops reading until the number of available sectors in the read cache buffer 104 has fallen below a threshold, indicating the buffer 104 is running short of sectors and will soon be out of sectors. During this period of time, the mass storage device 114 can idle or shut down. Advantageously, a media access device with a power saving feature can take advantage of this and lower its power consumption. For example, a DVD drive device can spin down. By entering a low power consumption mode, such as by spinning down, battery life of battery powered devices can advantageously be extended For example, power consumption can be reduced 50% or more for a standalone battery powered DVD drive, while power consumption for a laptop including a DVD drive can be reduced 15% or more. Of course in different systems, the power savings may be more or less than the foregoing examples.

Figure 2:
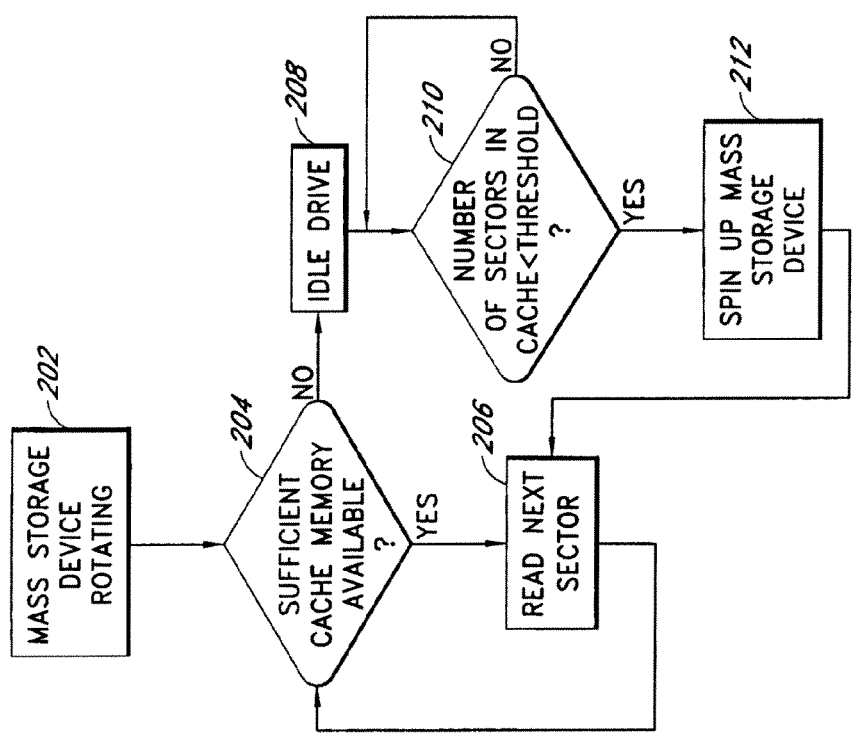
FIG. 2 illustrates an example read process.

Referring to the example process illustrated in FIG. 2, at state 202 the mass storage device 114 is rotating media, such as a DVD, and is thereby consuming a relatively large amount of power. At state 204, a determination is made as to whether there is sufficient free or available cache buffer memory 104 to store at least one sector of data, or other predetermined amount of data, from the media. If there is sufficient memory, the process proceeds to state 206 and a sector, or other predetermined amount, is read. The process then proceeds from state 206 back to state 204. If at state 204 the determination indicates there is insufficient cache buffer memory 104 available, the process proceeds to state 208 and the mass storage device 114 is idled so that it stops the rotation of the DVD, thereby reducing power consumption. The process proceeds to state 210, and waits until the available sectors in the read cache buffer 104 fall below a predetermined threshold. For example, the threshold can be related to the spin up time for the storage device 114. The threshold can be set to the amount needed to hold 10 seconds of audiovisual data, to 10 Mbytes, or to 5% of the buffer memory 104, though other thresholds can be used as well. The process then proceeds to state 212, at which point the mass storage device 114 is instructed to spin up. The process then proceeds to state 206 and the process resumes reading data from the drive, thereby preventing data starvation in the read track buffer 108.

Optionally, the process can read more than one sector at a time. For example, if at state 204 a determination is made that there is sufficient cache memory available to store three sectors of data, then at state 206 three sectors can be read into the cache memory buffer.

In one embodiment, read sectors in the read cache buffer 104 can be selectively reused. Such reuse allows for the quick access of data, and provides the ability to jump backwards during playback without incurring an additional read penalty which would otherwise occur if such jump back would require a relatively slower read operation from the mass storage. By way of example, such reuse advantageously allows a user to repeat and listen again to unclear dialogue or to repeat and review a video sequence.

Further, by storing substantial portions of multimedia data in the cache buffer 104, relatively quick, nearly instantaneous scanning mode playback is provided for at least a portion of a video title. This contrasts with many conventional systems that first require a wait for a drive to physically move a head to jump to the beginning of the scan section on the media disk.

The read cache manager 106 is configured to retain the address mappings of a sector that was previously read into the read cache buffer 104. When sectors that are requested by the read track buffer 208 have the same mapping addresses as sectors already present in the read cache buffer 104, the data for the old sectors in the read cache buffer 104 can advantageously be reused and copied or transferred to the read track buffer 208 directly, without sending additional read commands to the media access device. The reuse of sectors in the read cache buffer 104 thereby greatly increases the speed with which the sectors can be accessed for decoding and rendering.

Further, the read cache manager 106 provides for the intelligent replenishment of the read cache buffer 104 so that scanning modes, such as fast-forward or rewind, do not undesirably flush data from the read cache buffer 104.

In a media streaming scanning mode, the addresses of accessed sectors will typically be non-contiguous. For example, when performing a fast forward or reverse scan, optionally only sectors corresponding to MPEG I frames (Intracoded frames), which may occur only every few frames, are accessed. In these cases, the read cache manager 106 will search first in the read cache buffer 104 for corresponding cached sectors that are to be rendered during scanning. When corresponding data is not available, the read cache manager 106 can spin up the drive 114, if it is in the idle state, and then read sectors directly from the mass storage device 114 and store them to the read track buffer 108, so as to keep already cached sectors preserved for later use, rather than having them invalidated or deleted.

When sectors in the read cache buffer 104 are to be invalidated, it can be selectively performed. In one embodiment, the read cache manager 106 does not immediately invalidate sectors that have been retrieved by the track buffer. Depending on certain configuration parameters, the read cache manager 106 can advantageously keep a portion of data available for the case where the user may decide to re-access certain data, such as to "jump" backwards to replay a portion of the multimedia data. The decision as to what data to keep in the buffer 104 can be based on the likelihood that the user will want to access that data frequently and/or in the near term. Thus, for example, a DVD menu can be kept in the buffer 104 for extended periods of time or during a given viewing session. In deciding what data is to be kept in the buffer 104, selected weightings can be applied to corresponding sessions. For example, the menu can be given a first high weighting, audiovisual data viewed within a given past period (such as 1 minute), can be given a next highest weighting, and audiovisual data viewed more than a certain time ago (such as more than 5 minutes ago) can be given a lowest weighting. The higher the weight, the stronger the preference to keep the corresponding data in the buffer 104 even after it has been used.

Further, the cache manger 106 can store data from different regions of a DVD or other media in the read cache buffer 104 at the same time, and allows one or more sessions or local contiguous regions. For example, when a media title includes multiple views, such as video of multiple view angles of a scene or sporting event, media data corresponding to the multiple views can be read from the storage device 114 and stored together in the read cache buffer 104. Similarly, a DVD menu can be kept in the read cache buffer 104 even during playback of the DVD title or movie. The foregoing allows contemporaneous playback of different regions of multimedia data, such as, by way of example, the playback of both the DVD menu and the DVD title, or presentation of multiple DVD video angles in DVD at the same time. The resulting images can be shown in multiple windows, such as by using a picture in a picture format, or composed into a single window by blending the multiple images. In addition, even when two views, or a menu and title, are not displayed at the same, a user can switch from one view to another, or from the menu to the title, without having to perform an addition DVD access. Instead, when the views are stored in the read cache buffer 104, the user can instantly switch between views, or between the menu and the title.

Thus, the read cache manager 106 can manage more than one session of "contiguous sector access." That is, when the sector access position jumps to another address, the read cache manager 106 maintains sector address mapping for the sessions. The mapping optionally keeps a record of the address of the first sector in a given session of contiguous sectors. The mapping grows as more sectors are stored in the buffer 104. The read cache manager 106 and buffer 104 permit the contemporaneous decoding of one or more sessions by providing data for one or more sessions during the decoding process.

Further, the read cache manager 106 can automatically size the read cache buffer 104 to fit available memory on the platform, such as a personal computer or television set-top box. This enables relatively good performance in a wide variety of applications. Optionally, the read cache buffer 104 can be fixed or variable size. For example, the memory allocated for use as the read cache buffer 104 can be based on the amount of memory currently available. By way of example, the amount of memory can be determined in a computer via a system call.

In addition, the size of the read cache buffer 104 can be dynamically readjusted in order to free memory that had been allocated to the read cache buffer 104 so that the freed up memory can be used for other concurrent processes.

As similarly discussed above, optionally, the read cache buffer 104 can be located entirely in solid state volatile memory, entirely in non-volatile mass memory storage, such as magnetic hard disk drive or a solid state FLASH drive, or the read cache buffer 104 can be located partially in volatile memory and partially in non-volatile mass memory storage. Advantageously, by storing the read cache buffer 104 in local mass storage, such as on a hard disk drive, a large block of memory, in the gigabytes or more, can be allocated to the read cache buffer 104 for caching a media stream for reuse by other processes at a later time. This is useful for jukebox applications wherein a large number of multimedia items can be stored and retrieved as desired.

During the read cache buffer resizing, the read cache manager 106 can be configured not to discard pre-fetched media data in the read cache buffer 104. Optionally, portions of the data stored in the read cache buffer 104 memory that are not likely to be used can be discarded if the corresponding read cache buffer memory is needed for another session or for other data. Additional portions of the read cache buffer memory can optionally be freed after the media data contained in those portions are fetched by the track buffer.

In one embodiment, the read cache manager 106 caches sub-band data in synchronization with the cached data stream For example, a linked list or pointer can be used to associate sub-band data to corresponding audiovisual data in the buffer 104. Some sub-band data areas on media, such as CD or DVD media, is used to store auxiliary information in data sectors. For example, on a typical audio CD copyright information is stored as sub-band data. Similarly, navigation information can also be stored in the sub-band data. When the sub-band data is available, the read cache manager 106 optionally stores the sub-band data in the read cache buffer 104 in synchronization with cached media stream, so that a media reading application, such as an authoring tool or DVD player can retrieve the synchronized sub-band data when it is needed. The sub-band data is invalidated when the media sector it is associated with gets invalidated.

In addition, the read cache manger 106 handles read errors in synchronization with cached data stream. Some CD or DVD media are subject to physical damage such as a scratch or gouge on the data surface. Such physical damage can make the underlying data sectors unreadable. In one embodiment, upon encountering such unreadable sectors, the read cache manager 106 jump through the unreadable sectors by skipping certain amount of sectors depending on the severity of read errors. The read cache manager 106 stores read error flags in the read cache buffer 104 in synchronization with cached media stream, so that the media read application can determine that a read error exits for the portion of the media stream. For example, because the read cache buffer manager 106 reads ahead, a read error can be detected before the corresponding audiovisual data needs to be rendered. Thus, the error flag can be stored and optionally an error message will not be displayed to a user until the corresponding audiovisual data is supposed to be rendered.

During typical playback, when a reading application reads the media stream sequentially in the forward direction, the read cache manager 106 pre-fetches sectors, optionally as many sectors as possible, from the vicinity area on the mass storage device 114 with higher sector addresses as compared with the starting sector from which the forward scan will begin. However, the read cache manager 106 can also operate in the reverse direction. If the reading application is to read the media stream sequentially but in the reverse direction, such as during a reverse playback of video, the read cache manager 106 pre-fetches as many sectors as possible from the vicinity area on the mass storage device 114 with lower sector addresses, as compared with the starting sector from which the reverse scan will begin.

Figure 3:
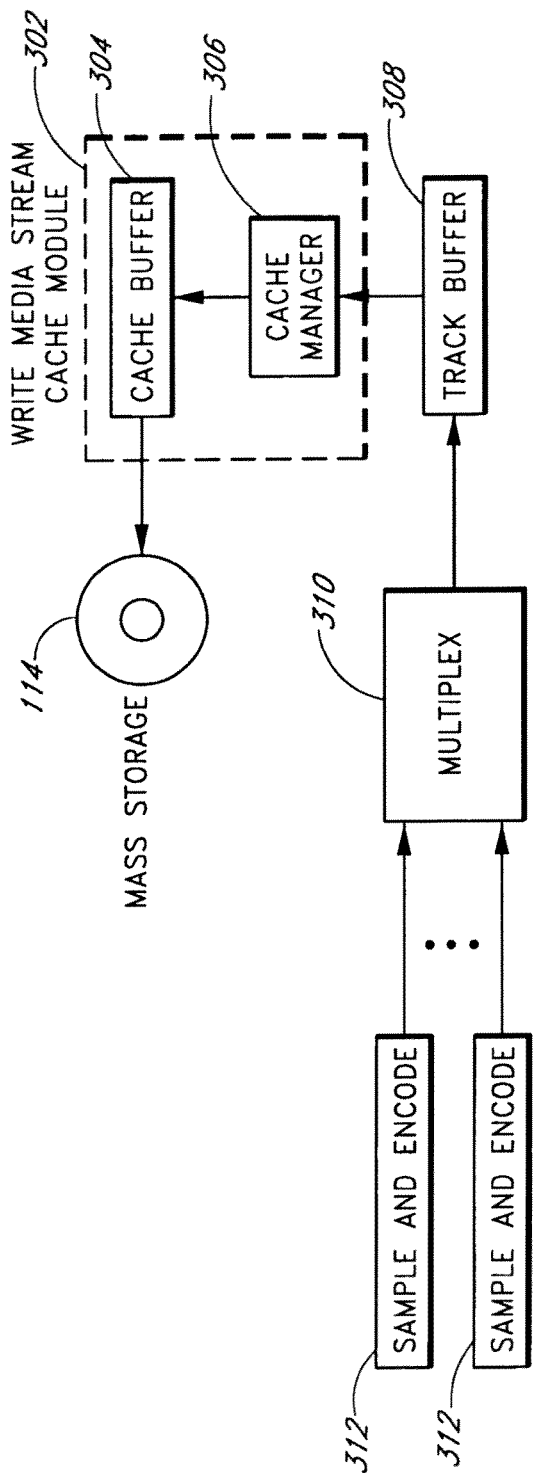
FIG. 3 illustrates an example system that can be used in accordance with one embodiment of the present invention to write multimedia data.

Stream caching for a write process will now be described in greater detail. Referring to the FIG. 3, sample and encode circuits 312 are coupled or wirelessly connected to the media source, such as mass storage device 114, and sample and encode the media source. The sample and encode circuits 312 provide the sampled and encoded media data to a multiplex circuit 310, which multiplexes the media streams, such as the video, audio, and sub-picture streams, into a program stream. The multiplex circuit 310 is coupled to a track buffer 308, which is in turn coupled or wirelessly connected to a write cache module 302. The write cache module 302 performs media stream caching. In one embodiment, the write cache module 302 includes a write cache manager 306 and a write cache buffer 304. The write cache buffer 304 can optionally be implemented as a circular or ring buffer.

The write media stream cache module 302 can be included in the same circuit and/or software as the read cache module 102. Similarly, the write cache manager 306 can be included in the same circuit and/or software as the read cache manager 106. As similarly described above with respect to the read cache buffer 104, the write cache buffer 304 can be formed from a portion of available system memory, such as from a portion of a computer system's main system RAM or a mass storage device. In another embodiment, the write cache buffer 304 includes dedicated memory reserved solely for use by the write cache manager 306. Further, the same memory can optionally be shared by the read cache buffer 104 and the write cache buffer 304. In one embodiment, the write cache manager 306 and the write cache buffer 304 are located in the same integrated circuit or chip or can optionally be located on separate circuits or chips.

The write cache buffer 304 stores media data that is to be written to the mass storage device 114, previously discussed with reference to FIG. 1. While in this example embodiment, the same storage device 114 is used for both writing and reading, optionally, different storage devices can be used for reading and writing. The write cache buffer 304 has a relatively large capacity compared to the write track buffer 308. For example, the write cache buffer 304 can be ten times, one hundred times, one thousand times, or more the size of the write track buffer 308. By way of example, the write cache buffer can be several gigabytes or more in size.

The write cache manager 306 controls the data transfer from the write track buffer 308 to the write cache buffer 304. The data transfer can be performed, for example, by physically copying memory blocks containing portions of the media stream, or through memory pointer manipulation. The write cache manager 306 also controls the data writing from the write cache buffer 304 to the mass storage device 114. In one embodiment, the same track buffer is used for both reading and writing. The write cache manager 306 and the write cache buffer 304 are configured to perform the following processes and provide one or more of the following optional advantages.

As will be described in greater detail below, the write cache manager 306 and the write cache buffer 304 are configured to reduce the frequency of media access. This advantageously reduces power consumption and can extend the useful life of a physical storage medium, such as a DVD or CD, and that of the corresponding device, such as a DVD or CD drive.

When the media access device is running, one embodiment of the write cache manager 306 is configured to keep writing media data to the device at a constant or substantially constant writing speed for as long as there is sufficient media data for an atomic writing unit. For example, the atomic writing unit can be 16 sectors, though other sizes can be used as well. During this period of time, the media access device can write data at an optimal or preferred speed efficiently and consistently.

After the write cache buffer 304 has less data than an atomic writing unit or other selected quantity, the write cache manager 306 stops writing to the device 114 until a predefined fullness level of the write cache buffer 304 is reached. During this period of time, the mass storage or media access device 114 can be idled or shut down thereby lowering power consumption. For example, a DVD drive device can spin down. This can advantageously extend battery life.

Before the write cache buffer 304 becomes full or when a certain threshold is reached, the write cache manager 306 resumes writing data to the mass storage device 114. This prevents data overflow in the write cache buffer 304 which could otherwise result if intermittent delays in writing operations occur.

Figure 5:
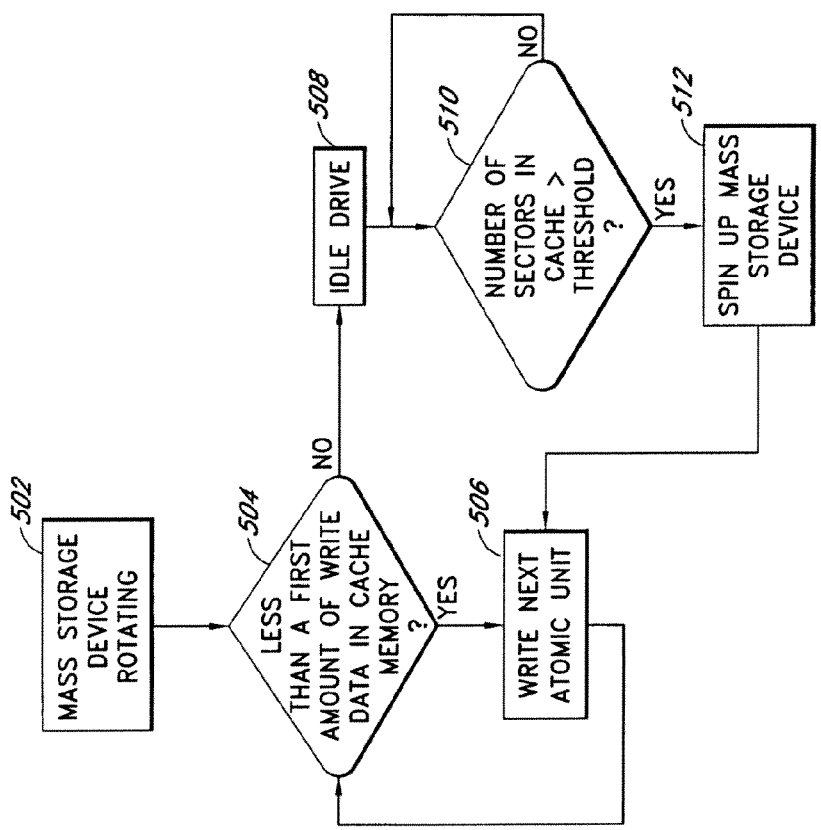
FIG. 5 illustrates an example write process.

Referring to the example process illustrated in FIG. 5, at state 502 the mass storage device 114 is rotating media, such as a DVD or disc drive, and is thereby consuming a relatively large amount of power. At state 504, a determination is made as to whether there is an insufficient or almost insufficient amount of write data in the write cache buffer memory 304. If there is sufficient data, the process proceeds to state 506 and an atomic unit sector, or other predetermined amount, is written. The process then proceeds from state 506 back to state 504. If at state 504 the determination indicates there is insufficient write data in the cache buffer memory 304, the process proceeds to state 508 and the mass storage device 114 is idled so that it stops the rotation of the DVD, thereby reducing power consumption. The process proceeds to state 510, and waits until the available data in the write cache buffer 304 exceeds a predetermined threshold. The process then proceeds to state 512, where the mass storage device 114 is instructed to spin up. The process then process to state 506 and the process resumes writing data to the drive.

In addition, the write cache manager 306 and the write cache buffer 304 can be used to reorder media sectors as desired before writing to the mass storage device 114. For example, it is often preferred to write media sectors to a physical medium, such as a DVD or CD, in a sequentially incrementing order of sector addresses, such as the logical block address (LBA). Thus, in one embodiment, the write cache manger 306 reorders some or all of the sector data stored in the write cache buffer 304 to achieve improved or optimized sequential writing, such as by arranging the stored sectors so that the sector addresses sequentially incrementing or decrementing.

In one embodiment, the write cache manager 306 is configured to retain the address mappings of a sector that was transferred from the write track buffer 308 to the write cache buffer 304. During the writing phase to the mass storage device 114, the write cache manager 306 can advantageously search the address mapping records for the next sequentially or substantially connected media sectors to write.

The write cache manager 306 frees space in the write cache buffer 304 after the corresponding media sectors are written to the mass storage device 114. The freed space can be advantageously recollected by a linking list table, which keeps track of the free addresses, and reused to load more media sectors from the write track buffer 308.

The write cache manager 306 can advantageously monitor incoming media data and their corresponding sector addresses from the write track buffer 308, and commit the writing of selected media sectors to the mass storage device 114 immediately for those media sectors that are ready or in a preferred state to write, such as when their sector addresses are sequentially connected to the most recently written sector address. The algorithm used here is analogous to how an elevator may react to the incoming passenger requests.

The write cache manager 306 and the write cache buffer 304 provide for the substantially concurrent writing of multiple media streams to the same physical medium. Certain applications, such as an authoring application, are capable of generating multiple media streams from different media source simultaneously, such as from. multiple live sources, or by regenerating edited media stream from multiple media files. For such applications, the relatively large write cache buffer 304 and the intelligent writing to mass storage device 114 managed by write cache manager 306 can advantageously handle the writing of multiple programs to the same physical medium, such as a DVD recordable disc with multiple titles, or a multiple angle title of a DVD disc.

As similarly discussed above with respect to the read cache manger 106 and the read cache buffer 104, the write cache manager 306 optionally automatically sizes the write cache buffer 304. The write cache buffer 304 size can be configured by the write cache manager 306 to fit available memory on the device (such as personal computer or television set-top box). This provides enables relatively good performance in a wide variety of applications.

In particular, the write cache buffer 304 can be fixed in size or can be variable in size. The memory allocated to the write cache buffer 304 can be allocated based on the amount of cache storage memory currently available to the device. Optionally, the size of write cache buffer 304 can be dynamically readjusted in order to free system or other memory for use by other concurrent processes.

As previously discussed, the write cache buffer 304 can be implemented using dedicated solid state memory and/or can be located on relatively fast access local mass storage, such as a magnetic hard disk drive. By implementing the write cache buffer 304 on local mass storage, a large amount of memory, for example, megabytes or gigabytes in size, can be allocated for caching the media stream. In addition, the local mass storage can be used to persist the cached stream, so that the cached stream, or portions thereof, can be reused later by other processes.

Preferably, during the write cache buffer 304 resizing process, the write cache manager 306 ensures that cached valid media data will not be dropped before written. That is, the space that contains valid media data is freed after the corresponding media data is written to the mass storage device and optionally verified.

As similarly discussed above with respect to the read cache manager and buffer, the write cache manger 306 and buffer 304 optionally provide sub-band data in synchronization with the cached write data stream. When the sub-band data needs to be written, the write cache manager 306 stores the sub-band data in the write cache buffer 304 in synchronization with the media stream. The write cache buffer 304 manager then writes the sub-band data to the mass storage device 114 when the corresponding media sector is to be written by the write cache manager 306. The sub-band data will be invalidated when the media sector it is associated with gets invalidated.

In addition, the write cache manger 306 handles writing to media even when some media sectors are unwritable. As discussed above, CD or DVD media are often subject to physical damage such as a scratch or gouge on the data surface. Such physical damage can make the data sectors unwritable. On encountering of such unwritable sectors, the write cache manager 306 can advantageously make use of the error handling mechanism of the physical medium. For example, some media, such as. DVD-RAM, DVD+RW, DVD-RW media, can use certain spared sectors to replace unwritable sectors. Thus, the unwritable sectors will be so mapped, and data that would otherwise be written to the unwritable damages is instead written to the spared healthy sectors. Because the write cache manager 306 can use the free space in the write cache buffer 304 to buffer the incoming media stream, the write cache manager 306 can safely spend time performing error handling with no or little risk that such error handling will block or interfere with the sampling/encoding process. The write cache manager 306 can also notify the application of critical read errors, such as when the target disk is so damaged that it cannot be written to.

Figure 4:
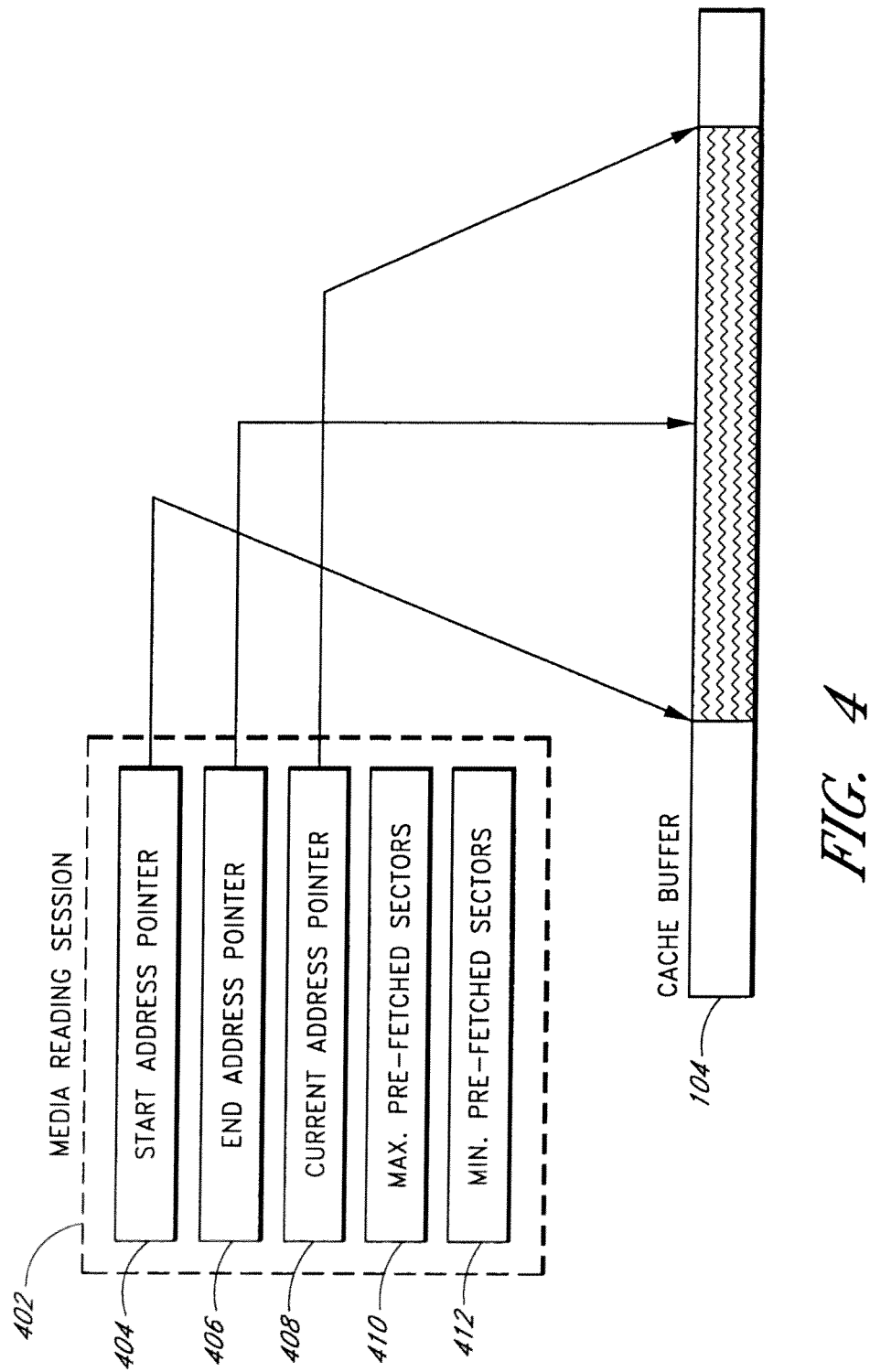
FIG. 4 illustrates pointers that can be used in one example media reading session.

Example read and write processes will now be disclosed in greater detail. With respect to the process, in one embodiment, read cache buffer memory space is divided into subsets. The subsets are dedicated to a corresponding media reading session. For a given media reading session 402, the read cache manager 106 maintains several pointers to the read cache buffer 104 and sets variables as depicted in FIG. 4 and as discussed below.

Read start address pointer 404: points to the address corresponding to the start of a media reading session. In particular, the start address pointer 404 points to the first valid media sector of the associated subset in the read cache buffer. The corresponding logical block address (LBA) from where this sector was read from the physical medium is also associated with this pointer.

End address pointer 406: points to the address corresponding to the end of the media reading session. In particular, the End address pointer 406 points to the last valid media sector of the associated subset in the read cache buffer. The corresponding logical block address (LBA) from where this sector was read from the physical medium is also associated with this pointer.

Current address pointer 408: points to the latest media sector that is transferred to the read track buffer on request of media reading application. For example, the Current address pointer 408 can point to the media sector corresponding to the current "playback position" and can be provided to a corresponding media reading application.

Max. pre-fetched sectors 410: Max. pre-fetched sectors 410 is the optional upper limit on the number of sectors the read cache manager 106 would read into the corresponding read cache buffer subset ahead of the Current address pointer 408 for a particular media reading session.

Min. pre-fetched sectors 412: Min. pre-fetched sectors 412 is the optional lower limit on the number of sectors the read cache manager 106 should preserve into the read cache buffer subset ahead of the Current address pointer 408 for a particular media reading session.

An example media reading algorithm, which is optionally termed a lazy media reading algorithm, that can be used by the cache manager 106, will now be discussed.

IF the media access device was reading sectors
  AND "End Address Pointer"-"Current Address Pointer">"Max. Pre-fetched Sectors"
  THEN stop reading sectors into the read cache buffer.
ELSE IF the media access device was NOT reading sectors
  AND "End Address Pointer"-"Current Address Pointer"<"Min. Pre-fetched Sectors"
  THEN start reading sectors into the read cache buffer.
ELSE do NOT change the current state of whether the cache manager pre-fetch sectors.

The value of Min. pre-fetched sectors 412 is selected to allow minimum tolerance of media access delay caused by the nature of the mass storage device, such as a DVD drive. For example, if the DVD drive has stopped spinning the disc in the reading idle period, the DVD drive needs to spin up the disc to a certain speed before the media reading can resume, or when there is a media seeking operation, the media reading process may be delayed. This setting can be used to ensure a minimal number of cached sectors are available for the current media reading session, and these sectors would be used to feed the read track buffer 108 when there is a media reading delay, so as to prevent data starvation in the media reading application.

The value of Max. pre-fetched sectors 410 can be selected to equal or be related to the maximal number of continuous media sectors that can be read into the cache buffer without overwriting the media sector pointed to by the Current address pointer 408. If, for example, the read cache buffer 104 is implemented as a circular buffer, the maximal value is typically equal to the capacity of the whole cache buffer 104. However, value of Max. pre-fetched sectors 410 can optionally be selected to be a lower value than the cache buffer capacity to allow a region of free space in the read cache buffer 104 reserved for other media reading sessions.

The transfer of sectors from the read cache buffer 104 to the read track buffer 108 can be performed through memory copies, or when the cache buffer memory 104 is shared with the read track buffer 108, the transfer can be performed through pointers to the buffers themselves in order to avoid memory copies, and the like. Thus, for example, the pointers associated with the read track buffer 108 can be adjusted to include a portion of the memory space that had been allocated to the read cache buffer 104. Thus, the track buffer and the cache buffer can each have their own set of corresponding pointers. For example, the track buffer 108 can have its own start address pointer and end address pointer.

Example behavior of the optional lazy media reading process is as follows. When the read cache manager 106 is currently reading sectors from media, the read cache manager 106 tends to retain the reading state as long as possible without running out of space in the read cache buffer 104 to efficiently cache sectors in the read cache buffer 104. This is especially advantageous when the mass storage device can support relatively fast access and direct data transfer, such as DMA (direct memory access).

When the read cache manager 106 is currently in the reading idle state, the read cache manager 106 tends to keep the mass storage device idling as long as possible without starving the read track buffer and the media reading application. This advantageously allows the mass storage device to power down or enter a power saving state to conserve battery life, and reduce wear on the drive and/or media.

In general, the read cache manager 106 can provide relatively lower frequency ("laziness") in changing state between reading and non-reading as compared to conventional systems. The frequency of media access is reduced as a result, allowing for the media drive to enter an idle, low power state for relatively more extended periods of time.

With respect to writing, conventional physical storage writing algorithms buffer the write data and queue write requests. Conventionally, the write requests remain in a command queue just as long as it takes for the digital storage medium to become available to write the data out. In contrast to these conventional approaches, in an optional embodiment "lazy" media writing is utilized. Thus, rather than writing data as soon as it is possible to write such data out, data is written when the write cache buffer reaches a given or predetermined level of fullness or when there is a first amount of write data in the write cache buffer. Advantageously, this enables the system to take advantage of write reordering to reorder sector writes to improve physical storage efficiency by allowing data to be written in a more contiguous manner, as well as to permit storage device spin down between writes. In addition, throughput to the storage medium is increased thereby permitting more write sessions to occur.

Figure 6:
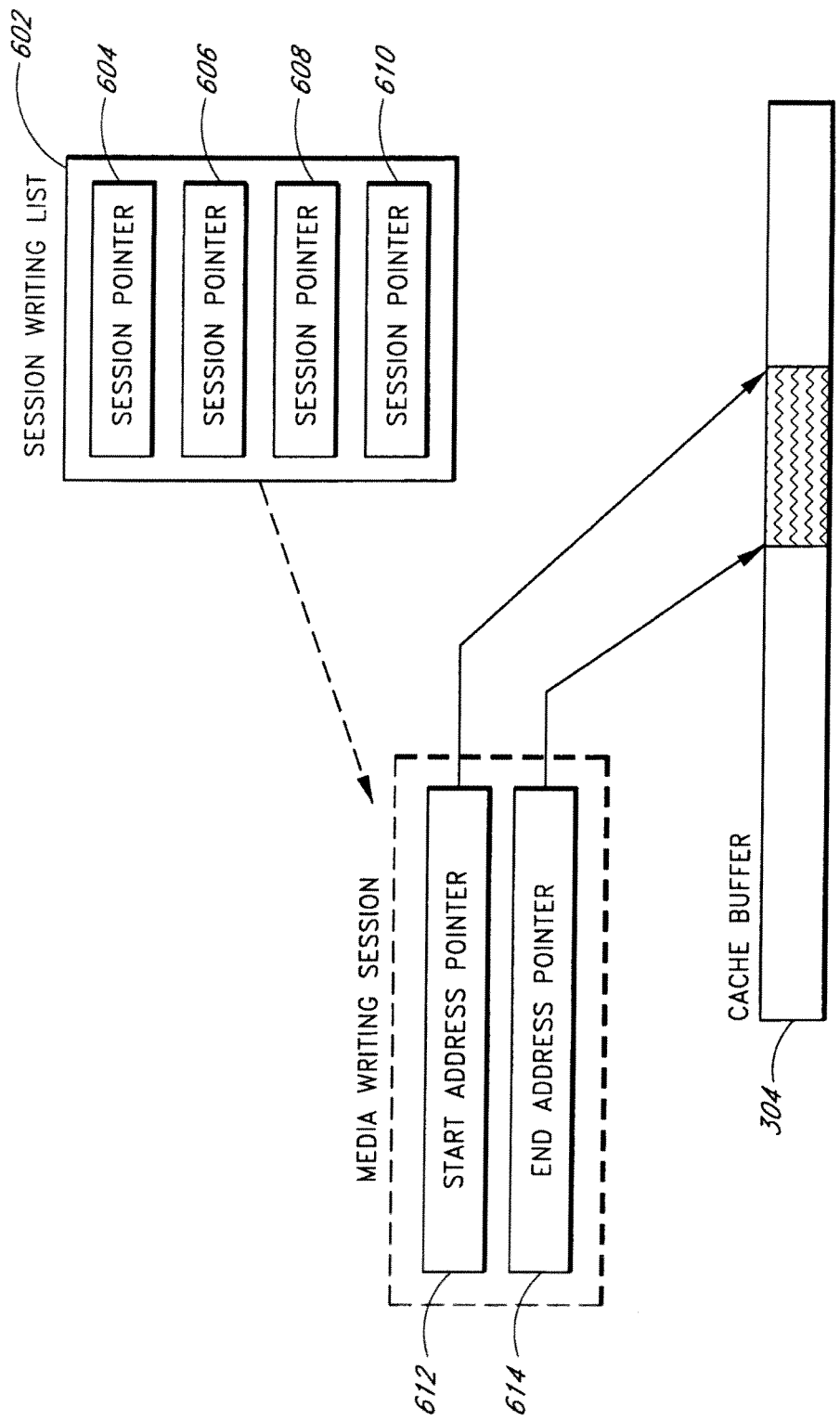
FIG. 6 illustrates an example of multiple sessions stored in a write buffer.

FIG. 6 illustrates an example of multiple sessions stored in the write cache buffer 304. A session writing list 602 can include a plurality of session pointers 604, 606, 608 and 610. Each session pointer can include a start address pointer 612 and an end address pointer 614 corresponding indicating the start and end of a corresponding session stored in the write cache buffer 304.

The lazy writing process is similar to the lazy media reading process described above, however writing is halted when the write buffer falls below a first threshold or a minimum number of prestored sectors and writing starts when the write buffer contains more than a second threshold of prestored sectors. The write buffer can contain multiple write session buffers corresponding to different sessions. When a session triggers a write process, then those write session buffers which have sufficient data are triggered for the write.

As discussed above, session based sector reordering can be used to enhance, improve, or optimize sequential reading from or writing to physical digital storage medium addresses.

In a typical digital storage device, the access time needed to reach a particular read or write location is based on the distance from the current read or write location. For example, when reading or writing to a physical tape device, the access time is often proportional to the tape distance between the two locations, excluding tape drive spin-up time. By way of another example, when reading or writing to a disk device, the access time is often proportional to the track distance between two locations, where the tracks can be considered concentric circles of a flat platter.

In one embodiment, an "elevator" write process, can be used to reduce or minimize read or write access times for multiple sessions. For example, the elevator process can be used for scheduling physically located disk requests. Thus, rather than prioritize write requests in the order in which they were received, write requests can be prioritized so as to reduce the number of head seeks needed by the storage device to which the data will be written. Thus, sectors that are to be written in the same local area on the storage device are grouped together in a write session.

By way of example, suppose that sessions A, B, C, D are reading or writing to four different locations on a disk drive. Without loss of generality, suppose the track numbers of these locations are ordered such that TrackNumber(A)<TRACKNUMBER(B)<TRACKNUMBER(C). Often, each multimedia session accesses data in a sequential matter.

Optionally, reading or writing the media sectors can be multiplexed such that the sessions are serviced from tracks A, B, C, D, C, B, A, B, C, and so forth, sweeping across the disk tracks much as an elevator sweeps up and down the floors of a building. While some conventional disk scheduling processes employ an elevator algorithm, these conventional processes have not employed the elevator algorithm utilizing the write or read media caches as described herein. The media caching allows more sectors to be accumulated in for sequential access and reordered for optimized or improved reading or writing. Hence, the use of the elevator algorithm with media cached buffers results in minimized or reduced time for track changes and drive spin up.

Optionally, the media sector writes can instead be multiplexed such that the sessions are serviced from tracks A, B, C, D, A, B, C, D, which may be advantageous in terms of session service fairness or balancing, or working with the physical media storage device cache.

In addition, session based sector reordering can be used to enhance, improve, or optimize nearly sequential reading from or writing to physical digital storage medium addresses. In many cases the data used by a session is not quite sequential, but exhibits considerable locality, that is, the reads or writes are located in a small region of the media at any given time.

For read caching in the case of nearly sequential reading, the session cache size is optionally set to be at least the size of the local region needed by the multimedia process. The multimedia data can be "speculatively" read without knowing whether it will actually be used or not before the data has to be flushed, overwritten, or deleted from the cache. Furthermore, the relevant disc locations are selected for the reads (the multimedia stream is interleaved with other streams of data), by modifying the reading to skip the locations that are identified as not necessary by a given application program.

For the write caching, the actual positions for the write are important and generally one cannot "speculatively" write locations as described above with respect to read caching to achieve sequential access because the system does not know the data to "speculatively" write. However, a write location can be speculatively written when the data is already preread, which will be the case if both read and write sessions overlap the same multimedia data location.

One optional use of reordering writes is to handle writing interleaved navigation or data search information within a multimedia stream. For DVDs, this interleaving is done on a disc sector basis. For example, a search table can be placed every 100 or other quantity of sectors of multimedia data, the table containing jump information from a quantity of sectors, such as 1000 sectors, previous to a quantity of sectors, such as 1000 sectors, ahead. Thus, for example, 1000 sectors of multimedia data can be queued in the future so that the current navigation search table can be generated. Furthermore, the current navigation search table and the subsequent multimedia data can be written using one contiguous write operation.

In one embodiment multiple read and multiple write sessions can be performed to thereby reduce access to the digital storage medium. Thus, when the digital medium is accessed either for reading or writing, reads for all the read sessions open and writes for all write sessions open can optionally be performed, thereby both filling the read caches and flushing the write caches. As described above, reordering of the medium accesses can be used to reduce physical medium utilization for the combined read and writes.

If the read or write cache managers do not overlap in media stream access, the cache buffers do not need to be shared between the read manager and the write manager. If the reads and writes overlap in access, the write and the read operation need to be synchronized, otherwise the read operation might be accessing invalid data. Synchronization can be performed by optionally sharing the same cache buffer, or a portion thereof, between the overlapping read and the write sessions. The reads and writes to the digital storage medium are optionally performed only when the either the read or the write cache managers require it. In addition, session based address mapping is optionally used to enable sector reordering for media writing The media caching systems and processes discussed above can be utilized in a variety of applications, such as consumer electronics devices which use digital storage media. Thus, by way of example, the consumer devices can include devices that contain CD, DVD or other optical drives, hard disk drives, and/or DV tape drives.

In particular, for digital tape recording and playback devices, where the read speed is slower than real time it can be advantageous to pre-buffer data in order to enable trick modes and/or faster playback.

An application of media caching is the management of recorded/recording television content. Since this television content is often stored on a rewritable physical medium, such as a hard disk drive, the television application needs write access to store the data and read access to play it back. When performing time-shifted viewing, writing and reading occur substantially simultaneously. For example, the user can be viewing the recorded beginning portion of a program, while the recorder is recording latter portions of the program. In particular, media caching enables the simultaneous use of the storage device to write the recorded data as well as read from multiple points from the recorded stream. Furthermore, the media cache enables the recorder to continue recording while the user fast forwards or rewinds previously recorded media, or perform trick play operations. The media session model described above allows this to occur at multiple positions of the media stream.

The media caching model can be extended if the user has two or more television tuners and wants to enable two simultaneous recordings; for example, one to save for later playback and one to view/time shift now. The two recordings can be stored to and read from a single or multiple digital storage device(s) using the media cache as discussed above. Media caching permits the use of a fewer storage devices by permitting multiple read and write processes to coexist at substantially the same time on the same device.

Another application of the media caching systems and processes described above is the network transmission of digital content to a portable device. For example, the portable device may not always be connected to the network as the user may move around an office or home with the portable device. Advantageously, the media caching can provide a local buffer so as not to stall or stop the multimedia content playback.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above.

What is claimed is:

1. A method of processing multimedia data, comprising:
   determining multimedia data to be read from a mass storage device; transferring a quantity of multimedia data from said mass storage device to a cache memory responsive to a read request for a first portion of said quantity of multimedia data, a remaining portion of said quantity of multimedia data anticipated being subject to future read requests; responsive to said first quantity of said multimedia data being stored in said cache memory, ceasing further transfer of said multimedia data from said mass storage device into said cache memory and causing said mass storage device to enter into a power saving mode; sequentially writing portions of said quantity of multimedia data from said cache memory to a track buffer for subsequent rendering to a display;
   at least partly in response to a portion of said quantity of said multimedia data yet to be written to said track buffer stored in said cache memory falling below a threshold value, causing said mass storage device to exit said power saving mode; and
   monitoring addresses associated with a unit of said multimedia data that is transferred from said track buffer to said cache buffer for writing to said mass storage device to thereby locate said write data that is to be written to said mass storage device after a previously written unit of said multimedia data.

2. The method according to claim 1 wherein, the step of sequentially writing is followed by the step of maintaining said quantity of multimedia data in said cache memory subsequent to it being rendered for facilitating a scan command without re-reading said multimedia data stored in said mass storage device.

3. The method according to claim 1 wherein, the step of sequentially writing includes the step of maintaining a DVD menu in said cache memory during playback of a movie stored on said mass storage device so that said DVD menu can be accessed without re-reading said DVD menu from said mass storage device.

4. The method according to claim 1 wherein, the threshold value is established in dependence upon at least one of a latency for the mass storage device to transfer multimedia data in response to a request to transfer multimedia data, a measure of power consumption of the mass storage device, a measure of battery lifetime for a device comprising the mass storage device, and a characteristic of a display to which the multimedia data is rendered.

5. A multimedia apparatus, comprising: a write track buffer configured to store a first amount of multimedia data; a write cache buffer that caches said multimedia data from said write track buffer, wherein said write cache buffer is larger than the size of said write track buffer by a predetermined factor, and wherein said write cache buffer stores said multimedia data for subsequent writing to a mass storage device; and a cache manager that causes said mass storage device to enter into a reduced power consumption mode when the amount of said multimedia data stored in said write cache buffer reaches a first level; and wherein said cache manager monitors addresses associated with a unit of said multimedia data that is transferred from said track buffer to said cache buffer for writing to said mass storage device to thereby locate said write data that is to be written to said non-volatile mass storage device after a previously written unit of said multimedia data.

6. The multimedia apparatus according to claim 5 further comprising;
   an encoder circuit configured to encode multimedia data; and
   a multiplex circuit that receives said encoded multimedia data from said encoder circuit, wherein said multiplex circuit is coupled to said write cache buffer.

7. The multimedia apparatus according to claim 5 wherein, said cache manager is configured to cause said mass storage device to enter into a higher power consumption mode when the amount of said multimedia data stored in said write cache buffer reaches a second level.

8. The multimedia apparatus according to claim 5 wherein, said cache manager is configured to at least one of write said multimedia data from said write cache buffer to said mass storage device when said multimedia data in said write cache buffer is above a second level and retain an address mapping of a unit of said multimedia data that has been read into said write cache buffer.

9. The multimedia apparatus according to claim 5 wherein, said write cache buffer can be dynamically modified in size.

10. The multimedia apparatus according to claim 5 wherein, the first level is established in dependence upon at least one of a latency for the mass storage device to store multimedia data in response to a request to store multimedia data, a measure of power consumption of the mass storage device, a measure of battery lifetime for a device comprising the mass storage device, and a characteristic of process generating the multimedia data to be stored.

11. A method comprising: providing a mass storage device for storing a multiplicity of blocks of multimedia data stored thereupon; providing a cache buffer coupled to said mass storage device for storing a plurality of blocks of multimedia data to be written to said mass storage device, said cache buffer having a capacity for storing a first amount of said multimedia data; providing a track buffer coupled to said cache buffer and having a storage capacity for storing a second amount of multimedia data to be written to said cache buffer, said second amount of multimedia data being provided from a process in execution upon a microprocessor; providing a cache manager coupled to said cache buffer and said track buffer for controlling the transfer of said multimedia data to said mass storage device from said cache buffer and to cache buffer from said track buffer, said cache manager responding to a write request for a particular block of multimedia data to be written to the mass storage device from said track buffer by storing said block of multimedia data in said cache buffer and for causing said mass storage device to exit a state of reduced power consumption and receive multimedia data from said cache buffer when the cache buffer reaches a first threshold level and for causing said mass storage device to enter a state of reduced power consumption and cease receiving multimedia data from said cache buffer when said cache buffer reaches a second threshold level, and said cache manager monitoring addresses associated with a unit of said multimedia data that is transferred from said track buffer to said cache buffer for writing to said mass storage device to thereby locate said write data that is to be written to said mass storage device after a previously written unit of said multimedia data.

12. The method according to claim 11 wherein, said cache manager transfers blocks of multimedia data in accordance with a priority hierarchy based upon at least one characteristic of said blocks of multimedia data, 13. The method according to claim 11 wherein, providing said cache buffer comprises providing at least one of a cache buffer formed using volatile memory and establishing its capacity for storing said first amount of said multimedia data in dependence upon at least one of a latency for the mass storage device to store multimedia data in response to a request to store multimedia data, a measure of power consumption of the mass storage device, a measure of battery lifetime for a device comprising the mass storage device, and a characteristic of the process in execution upon the microprocessor.

14. The method according to claim 11 wherein, the cache manager is configured to retain an address mapping of said blocks of multimedia data written to the mass storage device.

15. A method of processing media data to be written to a non-volatile mass storage device comprising:
   determining the quantity of media data stored in a cache buffer;
   when the quantity of media data stored in said cache buffer is at a first level, causing said non-volatile mass storage device to enter a state of reduced power consumption; and
   monitoring addresses associated with a unit of media data that is transferred from a track buffer to said cache buffer for writing to said non-volatile mass storage device to thereby locate said write data that is to be written to said non-volatile mass storage device after a previously written unit of said media data; and substantially immediately after locating said media data that is to be written after a previously written unit of said media data, causing said located media data to be written from said cache buffer to said mass non-volatile storage device.

16. The method according to claim 15 further comprising; providing a cache manager in communication with the cache buffer and non-volatile mass storage device, wherein the cache manager provides for substantially concurrent writing of multiple media streams to said non-volatile mass storage device.

17. The method according to claim 15 further the first level is determined in dependence upon at least one of a latency for the mass storage device to store multimedia data in response to a request to store multimedia data, a measure of power consumption of the mass storage device, a measure of battery lifetime for a device comprising the mass storage device, and a characteristic of the process in execution upon the microprocessor.

18. A method comprising: providing a write track buffer of a plurality of write track buffers, each write track buffer configured to store a predetermined amount of multimedia data; providing a write cache buffer for caching multimedia data received from each write track buffer of the plurality of write buffers, wherein said write cache buffer is configured to be larger than the largest write track buffer by a predetermined factor, and wherein said write cache buffer stores multimedia data received from each write track buffer of the plurality of write buffers for writing to a mass storage device; and providing a cache manager that causes said mass storage device to enter into a reduced power consumption mode when the amount of said multimedia data stored in said write cache buffer reaches a first level and exit the reduced power consumption mode when the amount of multimedia data stored in said write cache buffer reaches a second level; and wherein said cache manager monitors addresses associated with a unit of said multimedia data that is transferred from said write track buffer to said write cache buffer for writing to said mass storage device to thereby locate said write data that is to be written to said mass storage device after a previously written unit of said multimedia data.

19. A method according to claim 18 wherein, at least one of the first level and second level is established as being at least one of a quantity of multimedia data stored within the write cache buffer from all the plurality of write track buffers, the quantity of multimedia data within the write cache buffer, and a quantity of multimedia data stored with the write cache buffer from a predetermined write track buffer of the plurality of write track buffers.

20. A method according to claim 18 wherein, when the write cache buffer reaches the second level the cache manager causes at least one of all data within the write cache buffer to be written to the mass storage device in a predetermined sequence as a single write operation and all data relating to a predetermined write track buffer of the plurality of write track buffers to be written to the mass storage device as a single write operation to a predetermined portion of the mass storage device.

21. A method comprising: providing a read track buffer of a plurality of read track buffers, each read track buffer configured to store a predetermined amount of multimedia data; providing a read cache buffer for caching multimedia data retrieved from a mass storage device, wherein said read cache buffer is configured to be larger than the largest read track buffer by a predetermined factor, and wherein the read cache buffer stores multimedia data to be provided to each said read track buffer of the plurality of read track buffers; and providing a cache manager that causes said mass storage device to enter into a reduced power consumption mode when the amount of said multimedia data stored in said read cache buffer reaches a first level and exit the reduced power consumption mode when the amount of multimedia data stored in said read cache buffer reaches a second level; and wherein said cache manager monitors addresses associated with a unit of media data that is transferred from a write track buffer to a write cache buffer for writing to said mass storage device to thereby locate said write data that is to be written to said mass storage device after a previously written unit of said multimedia data.

22. A method according to claim 21 wherein, at least one of the first level and second level is established as being at least one of a quantity of multimedia data stored within the read cache buffer to be provided to the plurality of read track buffers, the quantity of multimedia data within the read cache buffer, and a quantity of multimedia data stored within the read cache buffer to be provided to a predetermined read track buffer of the plurality of read track buffers.

23. A method according to claim 21 wherein, when the read cache buffer reaches the second level the cache manager causes multimedia data to be transferred from the mass storage device in dependence upon at least one of the number of track buffers, a predetermined sequence, and in dependence upon the quantity of multimedia data within the read cache buffer for a subset of the plurality of read track buffers.

24. A method comprising: providing a mass storage device having a multiplicity of blocks of multimedia data stored thereon, said multimedia data including video and audio data; providing a cache buffer coupled to the mass storage device for storing a plurality of blocks of said multimedia data read from said mass storage device, said cache buffer having a capacity for storing a first amount of multimedia data; providing a track buffer coupled to said cache buffer and having a storage capacity for storing a second amount of multimedia data read from said cache buffer; and providing a cache manager coupled to said cache buffer and said track buffer for controlling transfer of said multimedia data from said mass storage device to said cache buffer and from said cache buffer to said track buffer, said cache manager responding to a read request for a particular block of multimedia data fetches said requested block of multimedia data and fetches additional blocks of multimedia anticipated being subject to future read requests to fill said cache buffer to a first level for transfer to said track buffer and said mass storage device enters a reduced power consumption mode responsive to said cache buffer being filled with a plurality of un-transferred blocks of multimedia data to a first threshold level, said mass storage device exiting said reduced power consumption mode responsive to at least said plurality of un-transferred blocks of multimedia data being below a second threshold level, said cache manager replacing blocks of transferred multimedia data in accordance with a priority hierarchy based on at least one characteristics of said blocks of multimedia data, and said cache manager monitoring addresses associated with a unit of said multimedia data that is transferred from said track buffer to said cache buffer for writing to said mass storage device to thereby locate said write data that is to be written to said mass storage device after a previously written unit of said multimedia data.

25. A method according to claim 24 wherein, the first level is at least one of a predetermined percentage of the cache buffer capacity, the currently available cache buffer capacity, and the currently available cache buffer capacity plus an overhead.

* * * * *

UNITED STATES PATENT AND TRADEMARK OFFICE
CERTIFICATE OF CORRECTION

PATENT NO. : 8,924,643 B2  
APPLICATION NO. : 12/872695  
DATED : December 30, 2014  
INVENTOR(S) : Lai et al.

It is certified that error appears in the above-identified patent and that said Letters Patent is hereby corrected as shown below:

Specification

In Column 4, Line 45, delete "session," and insert -- session. --, therefor.

In Column 5, Line 60, delete "such a the" and insert -- such a --, therefor.

In Column 7, Line 17, delete "a head" and insert -- ahead --, therefor.

In Column 11, Line 62, delete "from." and insert -- from --, therefor.

In Column 16, Line 47, delete "writing" and insert -- writing. --, therefor.

Claims

In Column 18, Line 42, in Claim 6, delete "comprising;" and insert -- comprising: --, therefor.

In Column 19, Line 37, in Claim 12, delete "data," and insert -- data. --, therefor.

In Column 20, Line 3, in Claim 16, delete "comprising;" and insert -- comprising: --, therefor.

In Column 20, Line 39, in Claim 19, delete "A method" and insert -- The method --, therefor.

In Column 20, Line 47, in Claim 20, delete "A method" and insert -- The method --, therefor.

In Column 21, Line 10, in Claim 22, delete "A method" and insert -- The method --, therefor.

In Column 21, Line 18, in Claim 23, delete "A method" and insert -- The method --, therefor.

In Column 22, Line 27, in Claim 25, delete "A method" and insert -- The method --, therefor.

Signed and Sealed this  
Seventeenth Day of November, 2015

Michelle K. Lee  
*Director of the United States Patent and Trademark Office*